(12) United States Patent
Mihara et al.

(10) Patent No.: US 8,397,249 B2
(45) Date of Patent: Mar. 12, 2013

(54) ELECTRONIC APPARATUS INCLUDING DISK DRIVE UNIT AND METHOD OF MANUFACTURING THE SAME

(75) Inventors: Daisuke Mihara, Kawasaki (JP); Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 13/116,505

(22) Filed: May 26, 2011

(65) Prior Publication Data

US 2012/0030693 A1    Feb. 2, 2012

(30) Foreign Application Priority Data

Jul. 30, 2010    (JP) ................................. 2010-172902

(51) Int. Cl.
*G11B 17/03*    (2006.01)
*H05K 5/00*    (2006.01)

(52) U.S. Cl. .................... 720/601; 720/646; 361/679.39

(58) Field of Classification Search .................. 720/601, 720/646, 647, 652–655, 657; 361/679.37–679.39, 361/679.33–679.36
See application file for complete search history.

(56) References Cited

U.S. PATENT DOCUMENTS
2004/0148614 A1 *    7/2004    Bae ............................... 720/601

FOREIGN PATENT DOCUMENTS
JP    07-037313    2/1995

* cited by examiner

*Primary Examiner* — Nathan Danielsen
(74) *Attorney, Agent, or Firm* — Staas & Halsey LLP

(57) ABSTRACT

An electronic apparatus includes a disk drive unit, a first casing and a second casing. The disk drive unit is provided inside the electronic apparatus and has an insertion slot into which a disk medium is to be slid or placed. The first casing covers an upper side of the disk drive unit and includes a cover portion covering an upper edge of the insertion slot. The second casing joins to the first casing and provides a housing portion housing the disk drive unit.

8 Claims, 19 Drawing Sheets

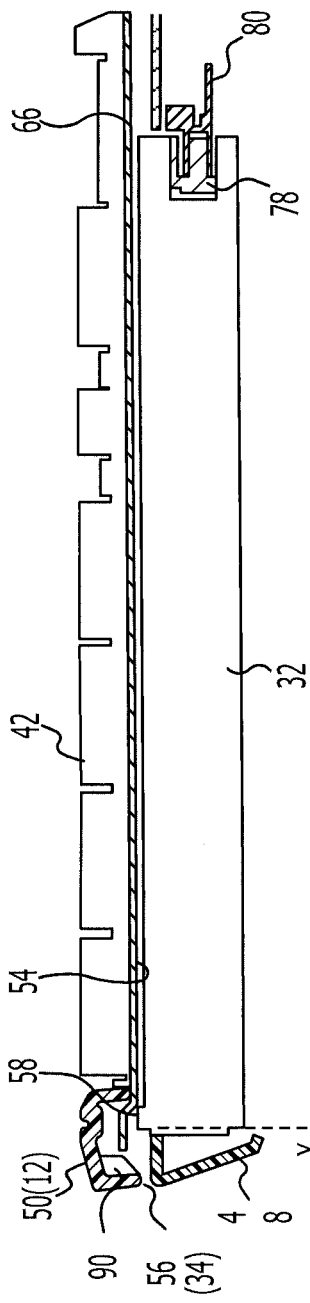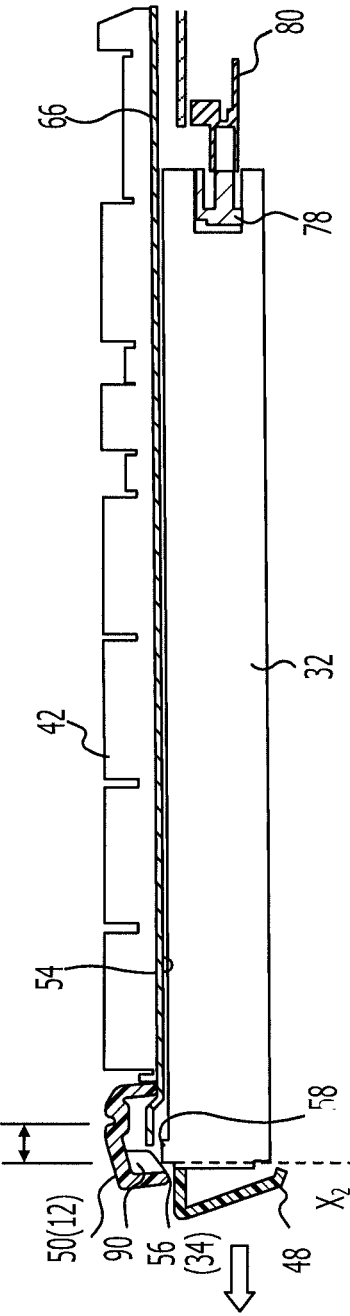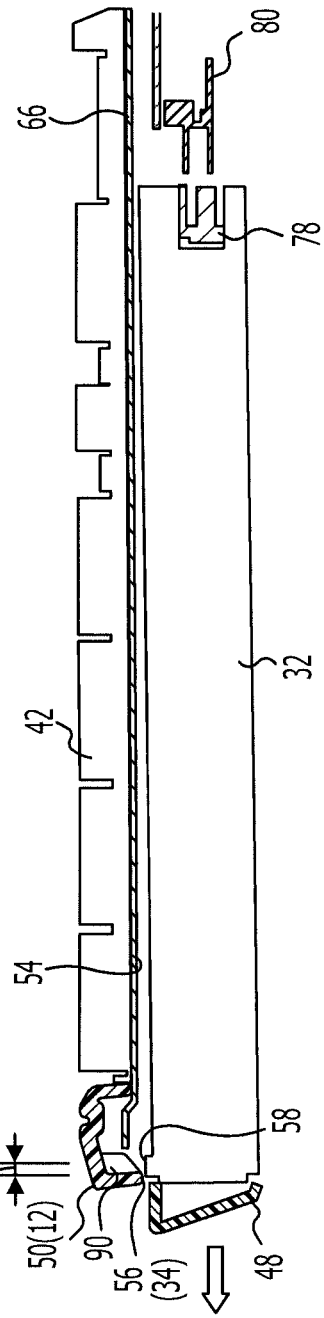

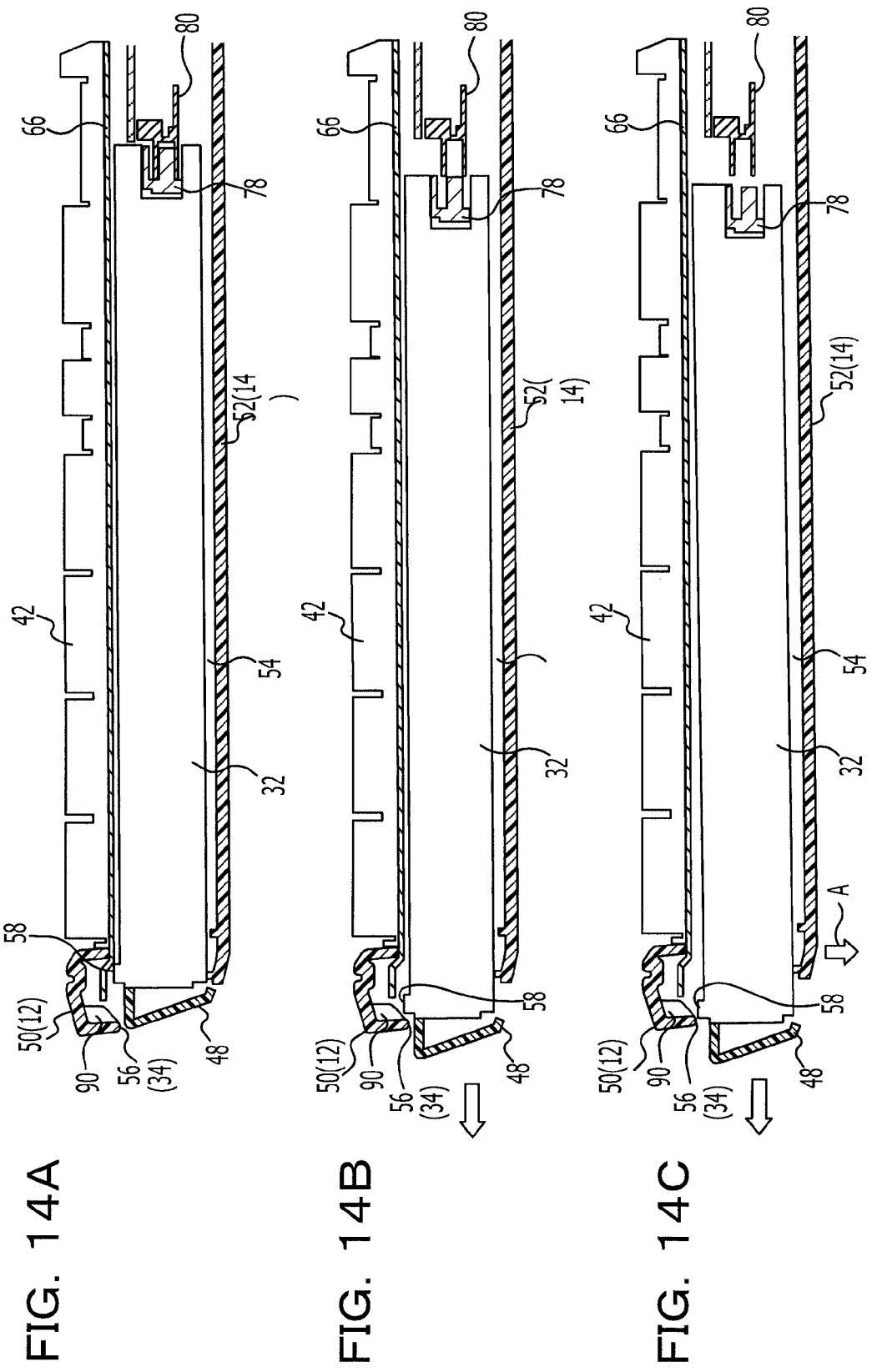

ELECTRONIC APPARATUS INCLUDING DISK DRIVE UNIT AND METHOD OF MANUFACTURING THE SAME

CROSS-REFERENCE TO RELATED APPLICATIONS

This application is based upon and claims the benefit of priority from the prior Japanese Patent Application No. 2010-172902 filed on Jul. 30, 2010, the entire contents of which are incorporated herein by reference.

FIELD

Various embodiments described herein relate to a casing technique for an electronic apparatus including a drive unit into which a recording medium is to be inserted. For example, an embodiment relates to an electronic apparatus including a structure that prevents misinsertion of a recording medium or the like into a gap produced between a drive unit and a casing, and to a method of manufacturing the same.

BACKGROUND

In inserting a recording medium, i.e., a disk, into an optical-disk-drive (ODD) unit mounted in an electronic apparatus, the disk may be misinserted into a gap or the like produced between, for example, the ODD drive unit and a casing of the electronic apparatus. To prevent such misinsertion, there are some electronic apparatuses such as an apparatus whose casing has a rib provided in the gap and an apparatus having a sponge or the like provided in the gap.

Among such structures that prevent the misinsertion of a disk into the drive unit, there is a typical technique in which a recess is provided in a tray for conveying a disk cartridge and a projection corresponding to the recess is provided on a casing of the apparatus, where the projection is configured to fit into the recess.

SUMMARY

According to an embodiment, an electronic apparatus includes a disk drive unit, a first casing and a second casing. The disk drive unit is provided inside the electronic apparatus and has an insertion slot into which a disk medium is to be slid. The first casing covers an upper side of the disk drive unit and includes a cover portion covering an upper edge of the insertion slot. The second casing joins to the first casing and provides a housing portion housing the disk drive unit.

An object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

BRIEF DESCRIPTION OF THE DRAWINGS

These and/or other aspects and advantages will become apparent and more readily appreciated from the following description of the embodiments, taken in conjunction with the accompanying drawings of which:

FIGS. 13A, 13B and 13C illustrate different exemplary inserted and removed states of an ODD device;

FIGS. 14A, 14B and 14C illustrate different exemplary inserted and removed states of an ODD device with a lower cover provided thereover;

DETAILED DESCRIPTION

Figure 1:
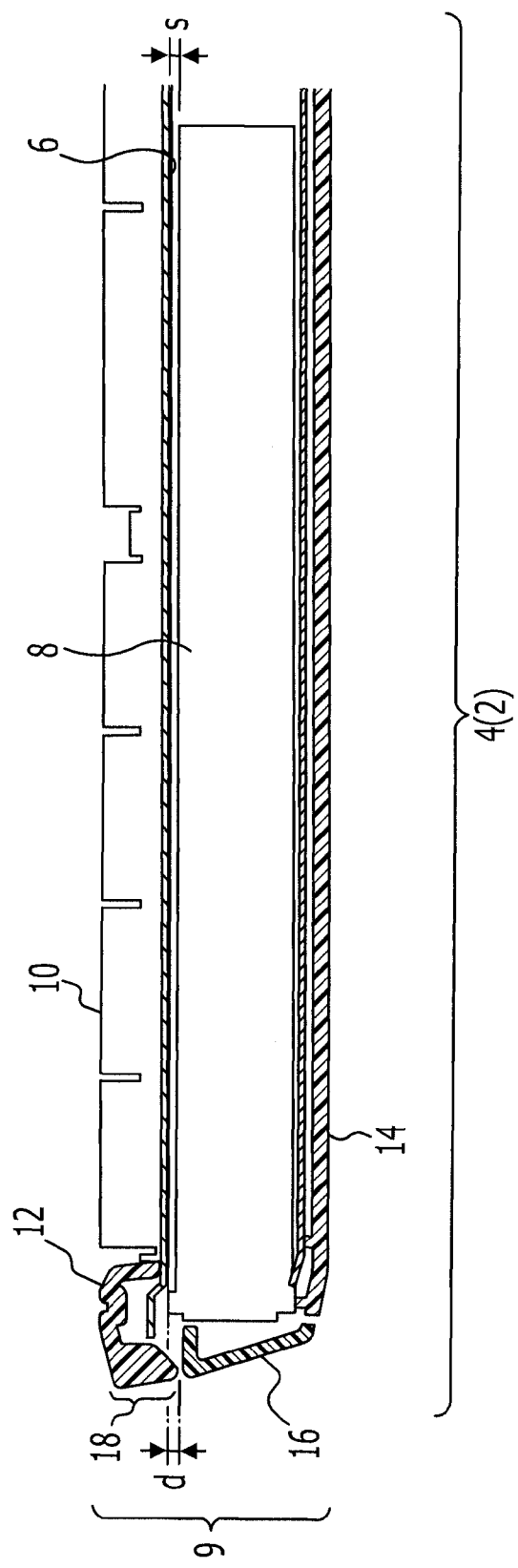
FIG. 1 is a cross-sectional view illustrating an exemplary configuration of an electronic apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Figure 2:
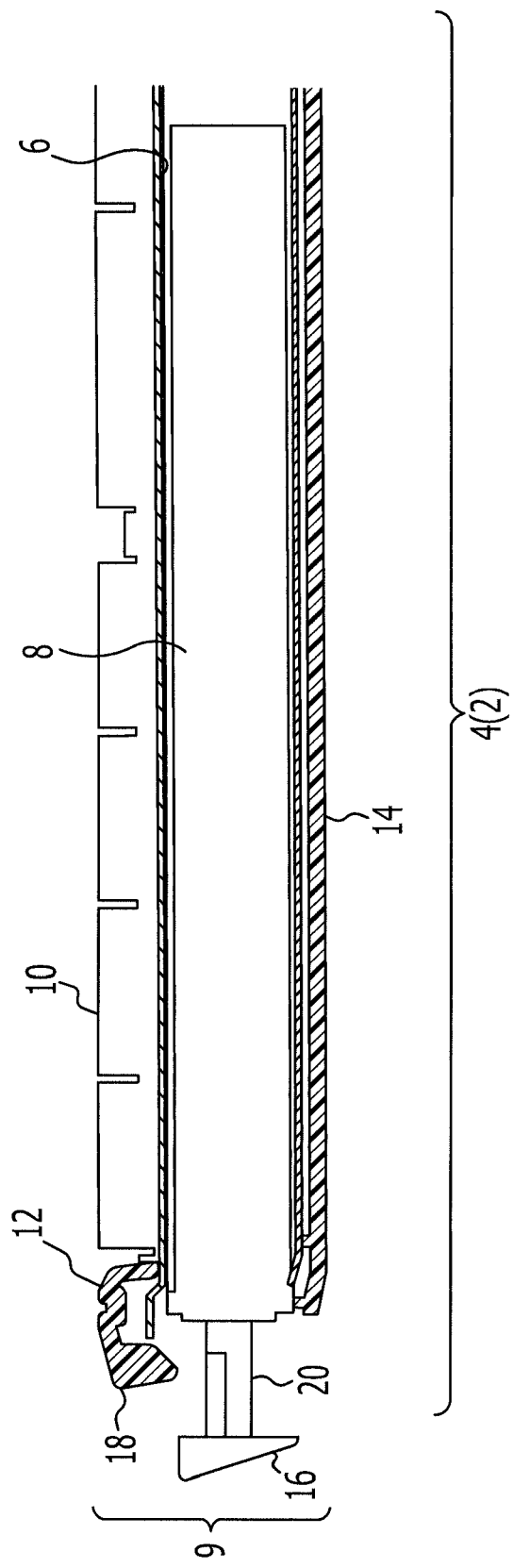
FIG. 2 illustrates an exemplary state where a conveying tray projects from an optical-disk-drive (ODD) unit.
Figure 3:
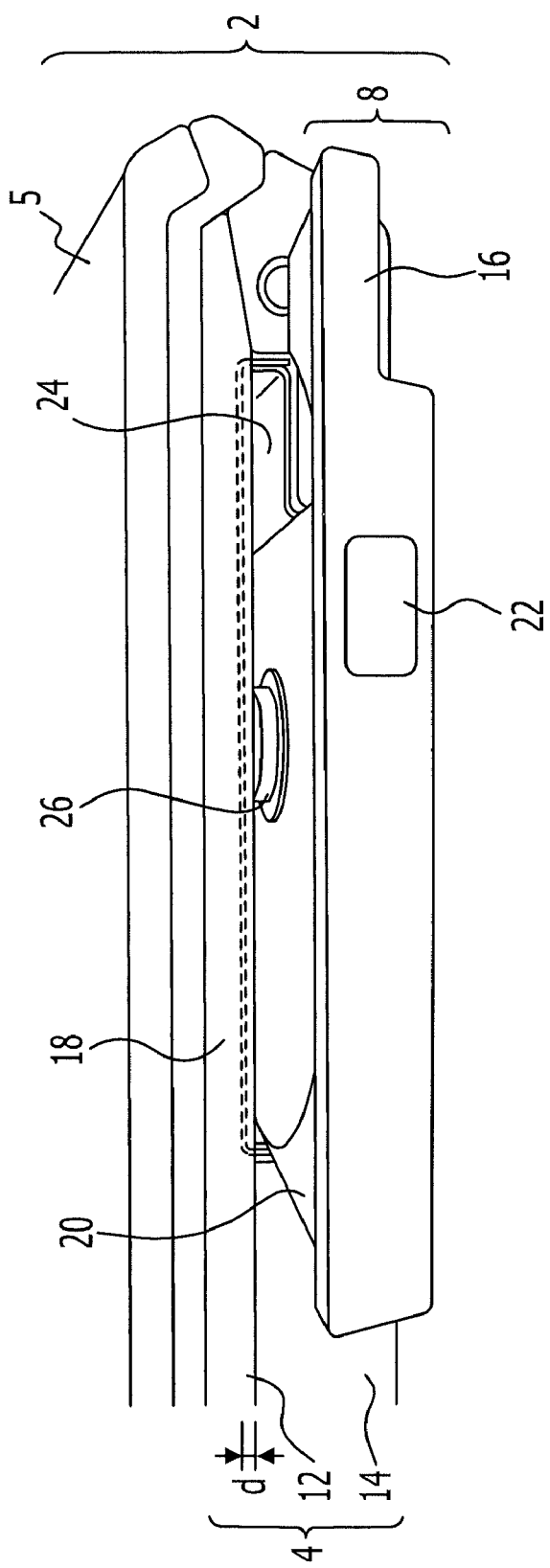
FIG. 3 illustrates an exemplary configuration of a housing of an electronic apparatus including a structure that prevents misinsertion into the ODD unit.

An embodiment will now be described with reference to FIGS. 1, 2 and 3. FIG. 1 is a cross-sectional view illustrating an exemplary configuration of an electronic apparatus 2 according to an embodiment. FIG. 2 illustrates an exemplary state where a conveying tray 20 projects from an optical-disk-drive (ODD) unit 8. FIG. 3 illustrates an exemplary configuration of a housing of the electronic apparatus 2 including a structure that prevents the misinsertion into the ODD unit 8. The elements illustrated in FIGS. 1, 2 and 3 are only exemplary, and the present disclosure is not limited thereto.

The electronic apparatus 2 is an exemplary electronic apparatus according to the present disclosure. The electronic apparatus 2 includes the ODD unit 8 housed in a housing portion 6 provided in a main unit 4. The main unit 4 includes a misinsertion-preventing structure 9 that prevents the misinsertion of an ODD medium that is to be inserted (or placed) into the ODD unit 8.

The ODD unit 8 is, for example, an access device that takes in an optical recording medium, such as a compact disk (CD), a digital versatile disk (DVD), etc., and performs reading and writing of data from and onto the recording medium. The ODD unit 8 is an exemplary disk drive unit. The electronic apparatus 2 may be a notebook personal computer (PC) or the like including the main unit 4 and a display-side unit 5 (see FIG. 3). The main unit 4 includes, for example, an operation portion 10 such as a keyboard, the ODD unit 8, function control portions, and so forth. The display-side unit 5 includes a display and so forth. While particular types of storage and devices are described herein, the present invention is not limited to any format or type of recording medium and device. For example, any medium and device onto which data can be input and maintained for retrieval may be used to implement the present invention.

The housing portion 6 of the main unit 4 is a space defined by, for example, joining an upper cover 12 and a lower cover 14 and houses the ODD unit 8 and so forth. The upper cover 12 is an exemplary first casing. The upper cover 12 forms a casing component that covers the upper side of the main unit 4 in such a manner as to, for example, allow the operation portion 10 and so forth to be exposed to the outside.

The upper cover 12 includes at a front end thereof a cover portion 18 projecting toward an ODD cover 16 included in the ODD unit 8. The cover portion 18 and the ODD cover 16 in combination form an exemplary misinsertion-preventing structure 9 that prevents the misinsertion of an ODD medium into the ODD unit 8. The cover portion 18, as an exterior member of the main unit 4, may have, for example, a curved or linear shape with respect to the ODD cover 16. The cover portion 18 is positioned in such a manner as to cover a part of the upper edge of the housing portion 6. That is, referring to FIG. 1, a tip of the cover portion 18 projects toward the lower edge of the housing portion 6 by a length d with respect to the upper edge of the housing portion 6. The length d may be, for example, the same as a gap s produced between the ODD unit 8 and the upper edge of the housing portion 6. Since the cover portion 18 projects toward the inside of the housing portion 6, when the ODD unit 8 is removed from the housing portion 6, a part of an upper portion of the ODD unit 8 comes into contact with the cover portion 18.

The lower cover 14 is an exemplary second casing that forms a part of the main unit 4 by being joined to the upper cover 12. The lower cover 14 holds devices, for example such as the ODD unit 8 and control components such as a motherboard mounted in the electronic apparatus 2 at respective positions.

The ODD cover 16 serves as means for protecting the front face of the ODD unit 8 and forms a part of an exemplary misinsertion-preventing structure 9. Referring to FIG. 2, the ODD unit 8 includes the conveying tray 20 on which an ODD medium is to be placed and with which the ODD medium held thereon at a predetermined position and in a predetermined orientation is insertable into the ODD unit 8. The ODD cover 16 is provided at the front end of the conveying tray 20. The conveying tray 20 with the ODD cover 16 is slidable toward the front face of the electronic apparatus 2. The ODD cover 16 is positioned in such a manner as not to interfere with the cover portion 18, with a gap therebetween not allowing the insertion of the ODD medium.

Referring to FIG. 3, the ODD cover 16 has an open button 22 that opens the ODD unit 8. When the open button 22 is pressed, the conveying tray 20 slides to such a position that an ODD medium can be placed thereon, or the conveying tray 20 projects to such a position as to be slidably operable. The ODD cover 16 has a specific thickness in a direction of sliding of the conveying tray 20. For example, when the conveying tray 20 is in the main unit 4, the ODD cover 16 becomes flush with the cover portion 18 and the display-side unit 5.

The ODD unit 8 has an insertion slot 24 into which the ODD medium placed on the conveying tray 20 is to be inserted. The conveying tray 20 has, for example, a retaining projection 26 as means for retaining the ODD medium placed thereon at the predetermined position. The ODD medium (not illustrated) has, for example, a receiving hole corresponding to the retaining projection 26. The ODD medium is placed onto the conveying tray 20 such that the retaining projection 26 is fitted into the receiving hole. As alternative means for retaining the ODD medium, the conveying tray 20 may have a step-like receiving surface that fits the shape of the ODD medium.

The insertion slot 24 of the ODD unit 8 is provided in such a manner as to be positioned on the inner side of the electronic apparatus 2 with respect to the cover portion 18 of the upper cover 12, and a part or the entirety of an upper front portion of the insertion slot 24 is covered by the cover portion 18. That is, in the state where the conveying tray 20 projects, the upper front portion of the insertion slot 24 of the ODD unit 8 is covered by the cover portion 18 and is not exposed to the outside of the electronic apparatus 2, as illustrated in FIG. 3.

Since the gap between the ODD unit 8 and the upper edge of the housing portion 6 is not exposed to the outside of the electronic apparatus 2, the misinsertion of an ODD medium into the gap is prevented. If the user attempts to forcibly insert an ODD medium into the gap between the cover portion 18 and the ODD cover 16, the ODD medium interferes with the front face of the ODD unit 8. Therefore, the ODD medium does not enter the gap between the ODD unit 8 and the upper edge of the housing portion 6.

According to the above configuration, the gap between the ODD unit 8 and the casing of the electronic apparatus 2 is not exposed to the outside of the casing because of the structure included in the casing that houses the ODD unit 8. Therefore, the misinsertion of a disk medium is prevented, whereas the ease of assembly of the electronic apparatus 2 is not reduced. Moreover, there is substantially no possibility that a gap is produced by deformation of the ODD unit 8 or the electronic apparatus 2. Therefore, the misinsertion of a disk medium is prevented. Furthermore, the misinsertion-preventing structure 9 does not interfere with the ODD unit 8. Therefore, the occurrences of abnormality of the disk medium, noise, and the like are prevented.

Figure 4:
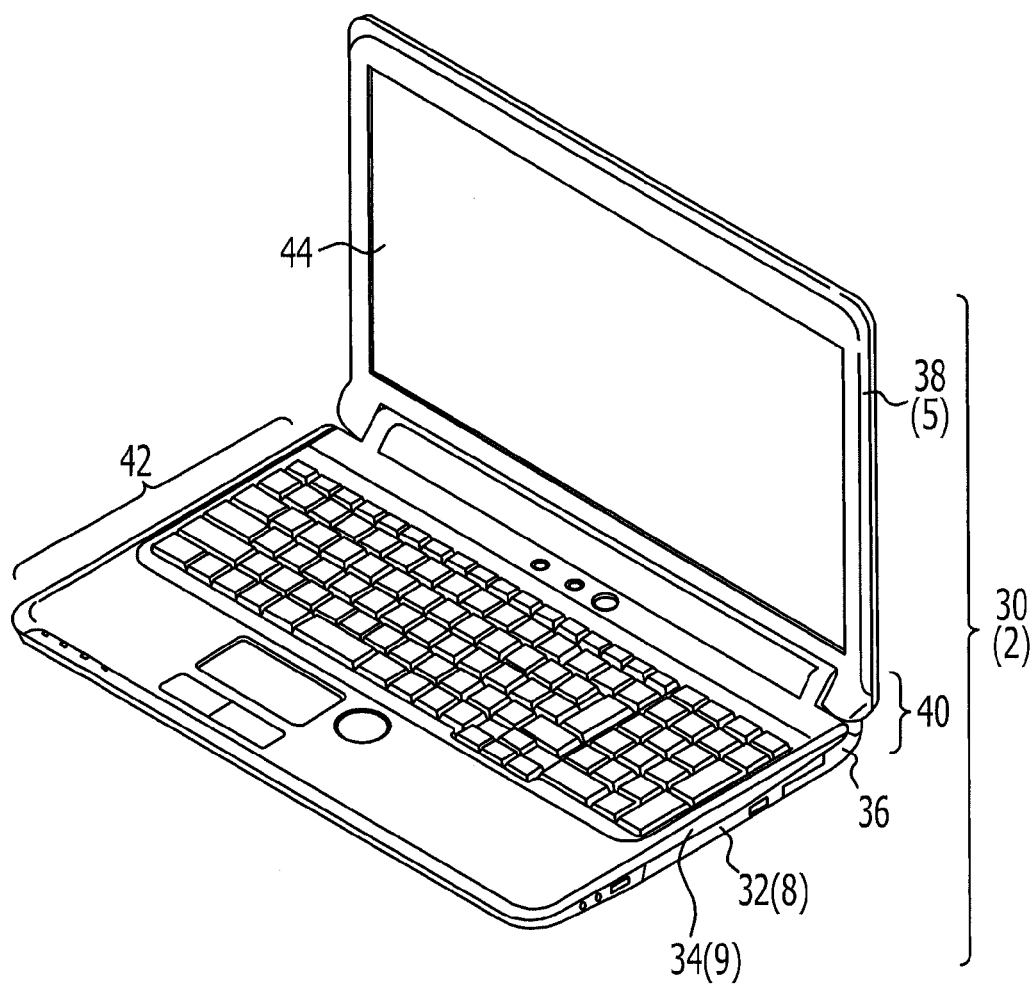
FIG. 4 illustrates an exemplary appearance of a personal computer (PC) according to an embodiment.
Figure 5:
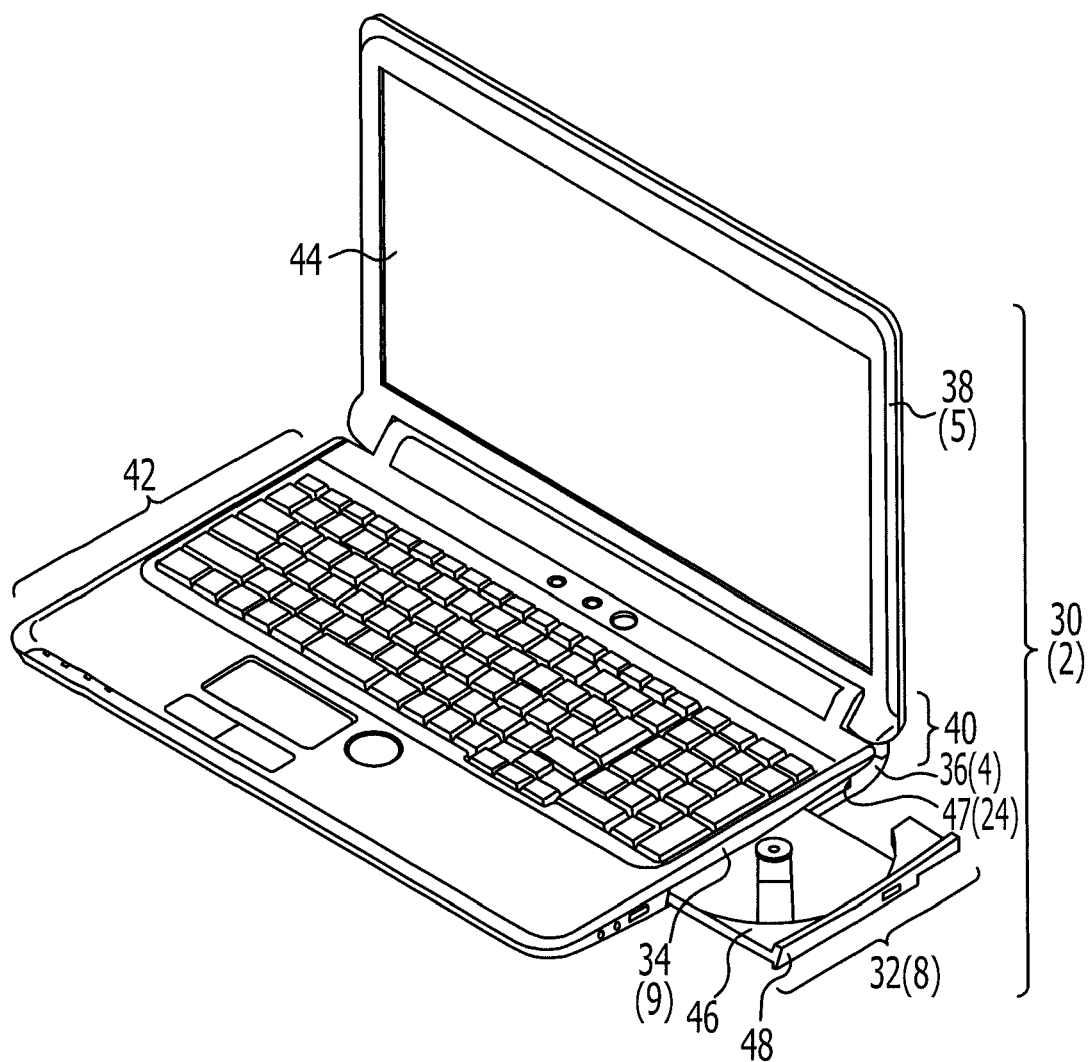
FIG. 5 illustrates another exemplary appearance of a PC in a state where a tray projects from an ODD device.
Figure 6A:
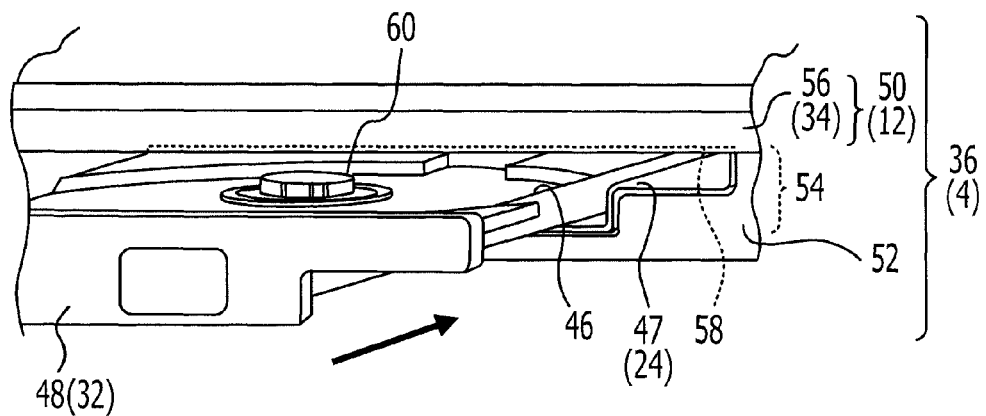
FIGS. 6A, 6B and 6C illustrate an exemplary configuration of a misinsertion-preventing structure in different open and closed states of a tray of the ODD device.
Figure 6B:
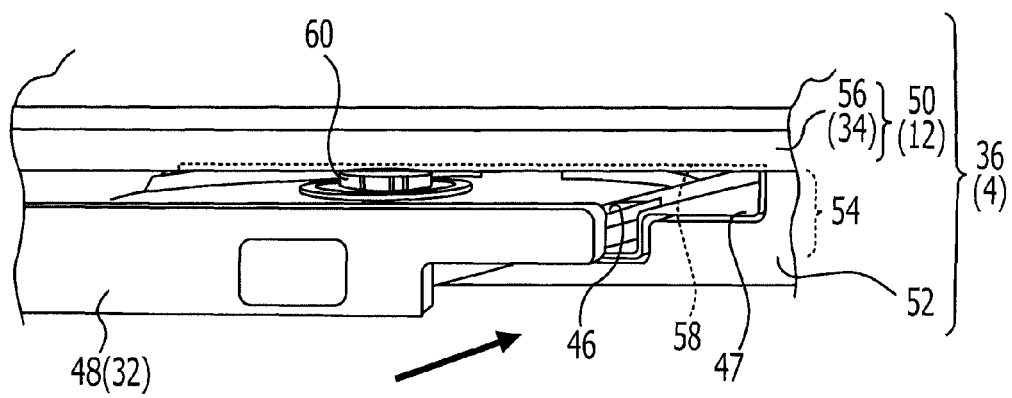
Figure 6C:
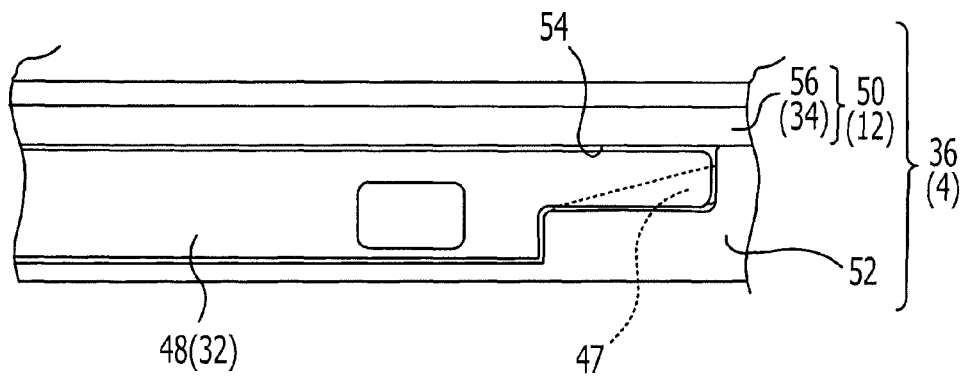

Another embodiment will now be described with reference to FIGS. 4, 5, 6A, 6B and 6C. FIG. 4 illustrates an exemplary appearance of a personal computer (PC) 30 according to an embodiment. FIG. 5 illustrates another exemplary appearance of the PC 30 in a state where a tray 46 projects from an ODD device 32. FIGS. 6A, 6B and 6C illustrate an exemplary configuration of a misinsertion-preventing structure 34 in different open and closed states of the tray 46 of the ODD device 32. The elements illustrated in FIGS. 4, 5, 6A, 6B and 6C are only exemplary, and the present disclosure is not limited thereto. Furthermore, redundant descriptions of the elements illustrated in FIGS. 4, 5, 6A, 6B and 6C that are identical with those illustrated in FIGS. 1, 2 and 3 are omitted.

The PC 30 is an exemplary electronic apparatus according to the present disclosure and includes a misinsertion-preventing structure 34 for the ODD device 32 mounted in the PC 30 as illustrated in FIG. 4. The PC 30 also includes, for example, a main unit 36 and a display-side unit 38 that are connected to each other at a hinge portion 40 such that the display-side unit 38 is openably and closably moveable towards the main unit 36 and vice versa.

The main unit 36 is an example of the main unit 4 described above. The main unit 36 includes, for example, an operation portion 42 including a keyboard, a touch pad, a mouse, and so forth; a drive device such as the ODD device 32; and control components such as a control board. The main unit 36 also includes on a side face thereof the misinsertion-preventing structure 34 that prevents the misinsertion of an ODD medium into the ODD device 32.

The display-side unit 38 is an example of the display-side unit 5 described above. The display-side unit 38 includes a display 44, for example, a liquid crystal display (LCD) or the like.

The ODD device 32 is an example of the ODD unit 8 described above. The ODD device 32 is housed on one side of the main unit 36 of the PC 30. Referring to FIG. 5, the ODD device 32 includes the tray 46 that conveys an ODD medium. An ODD medium is inserted into or ejected from an insertion slot 47 of the ODD device 32 by sliding the tray 46 in the lateral direction of the PC 30. The tray 46 includes an ODD cover 48 forming a part of the main unit 36 of the PC 30.

Referring to FIGS. 6A, 6B and 6C, the ODD device 32 is housed in a housing portion 54 defined by joining an upper cover 50 and a lower cover 52 of the main unit 36. The upper cover 50 has a rib 56 functioning as the misinsertion-preventing structure 34. The rib 56 is an example of the cover portion 18 described above. The rib 56 forms a part of a sidewall of the main unit 36 of the PC 30 and projects to such a position as to cover an upper casing edge 58 of the ODD device 32 that defines the insertion slot 47. The upper casing edge 58 is an exemplary upper casing portion of the ODD device 32 mounted in the PC 30.

FIGS. 6A, 6B and 6C illustrate different open and closed states of the tray 46 of the ODD device 32 relative to a position to which the rib 56 projects.

The tray 46 having an ODD medium (not illustrated) placed thereon with reference to a retaining projection 60 is slid into the insertion slot 47 of the ODD device 32. Referring to FIG. 6A, in a state where the tray 46, having the retaining projection 60, is ready to receive the ODD medium, the tray 46 is exposed to the outside of the insertion slot 47.

Referring to FIG. 6B, the rib 56 projects to such a position as not to interfere with the retaining projection 60. In the ODD device 32, the tray 46 is slid into the insertion slot 47 automatically upon an opening and closing operation or manually. The rib 56 only needs to project to such a position that, for example, the ODD medium is prevented from entering a gap between the rib 56 and the retaining projection 60.

Referring to FIG. 6C, the tray 46, having the retaining projection 60, advances below the rib 56 and is housed into the insertion slot 47. An upper portion of the ODD cover 48 has, for example, a shape corresponding to the shape of the rib 56 and prevents the insertion of the ODD medium by being in contact with the rib 56. The ODD cover 48 and the rib 56 may be, for example, curved toward the hinge portion 40 of the PC 30. Thus, the insertion of an ODD medium having a linear shape is prevented, and the ODD cover 48 and the rib 56 in combination form the misinsertion-preventing structure 34.

Figure 7:
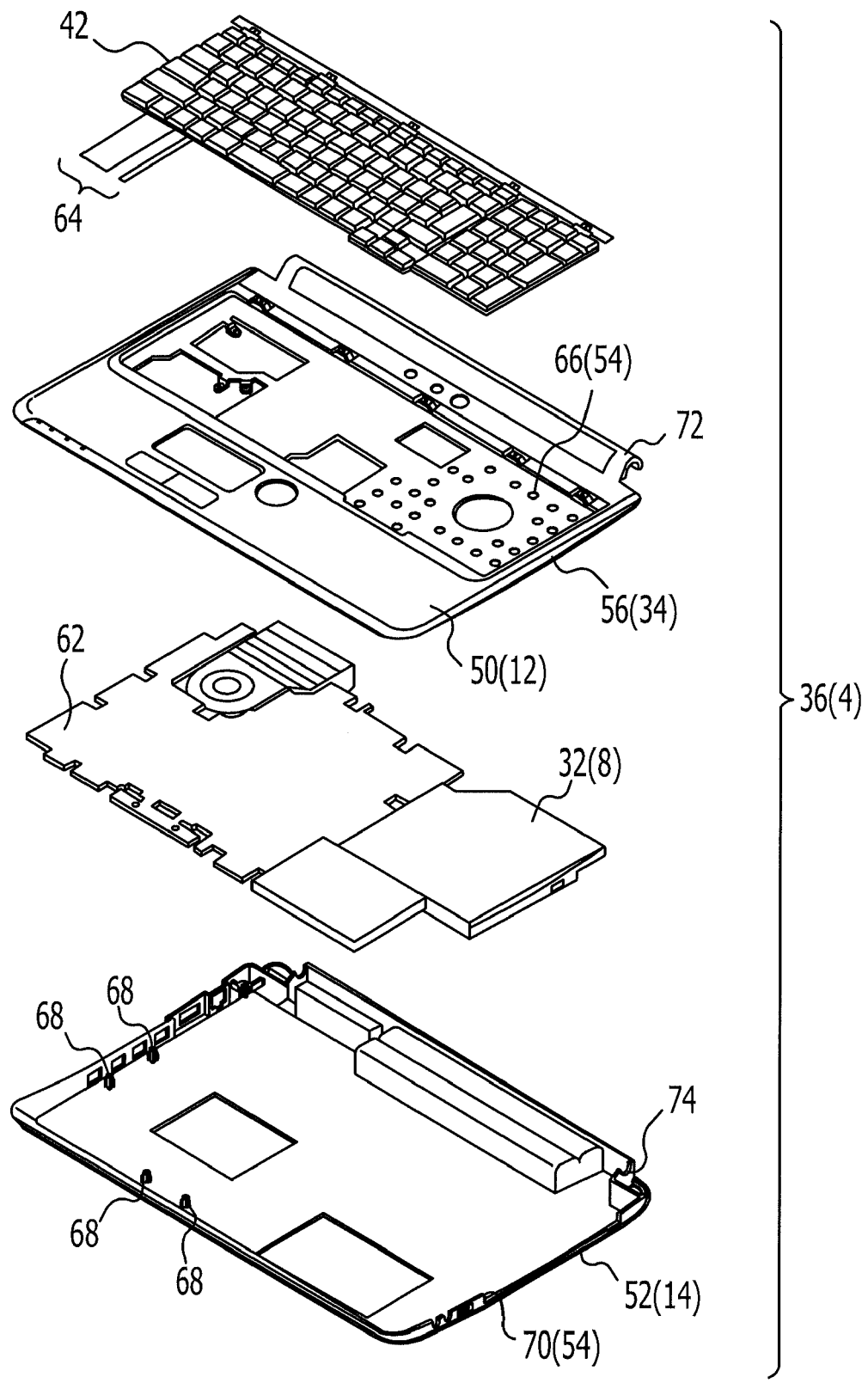
FIG. 7 is an exploded view illustrating an exemplary configuration of a main unit of the PC.
Figure 8:
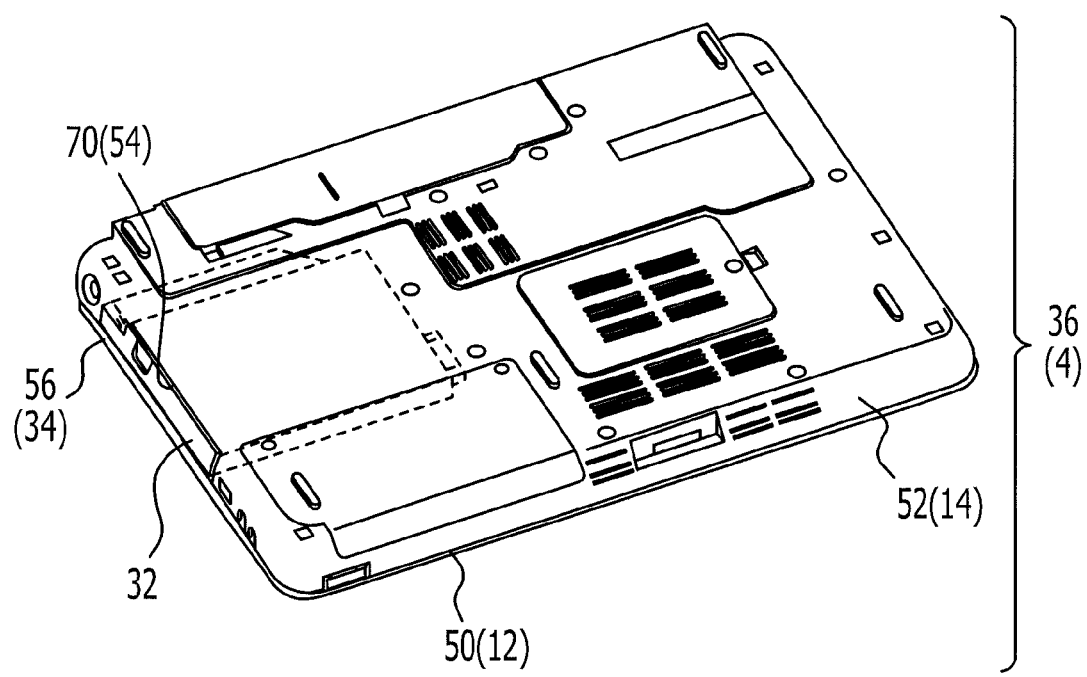
FIG. 8 illustrates an exemplary bottom configuration of a main unit of a PC.
Figure 9:
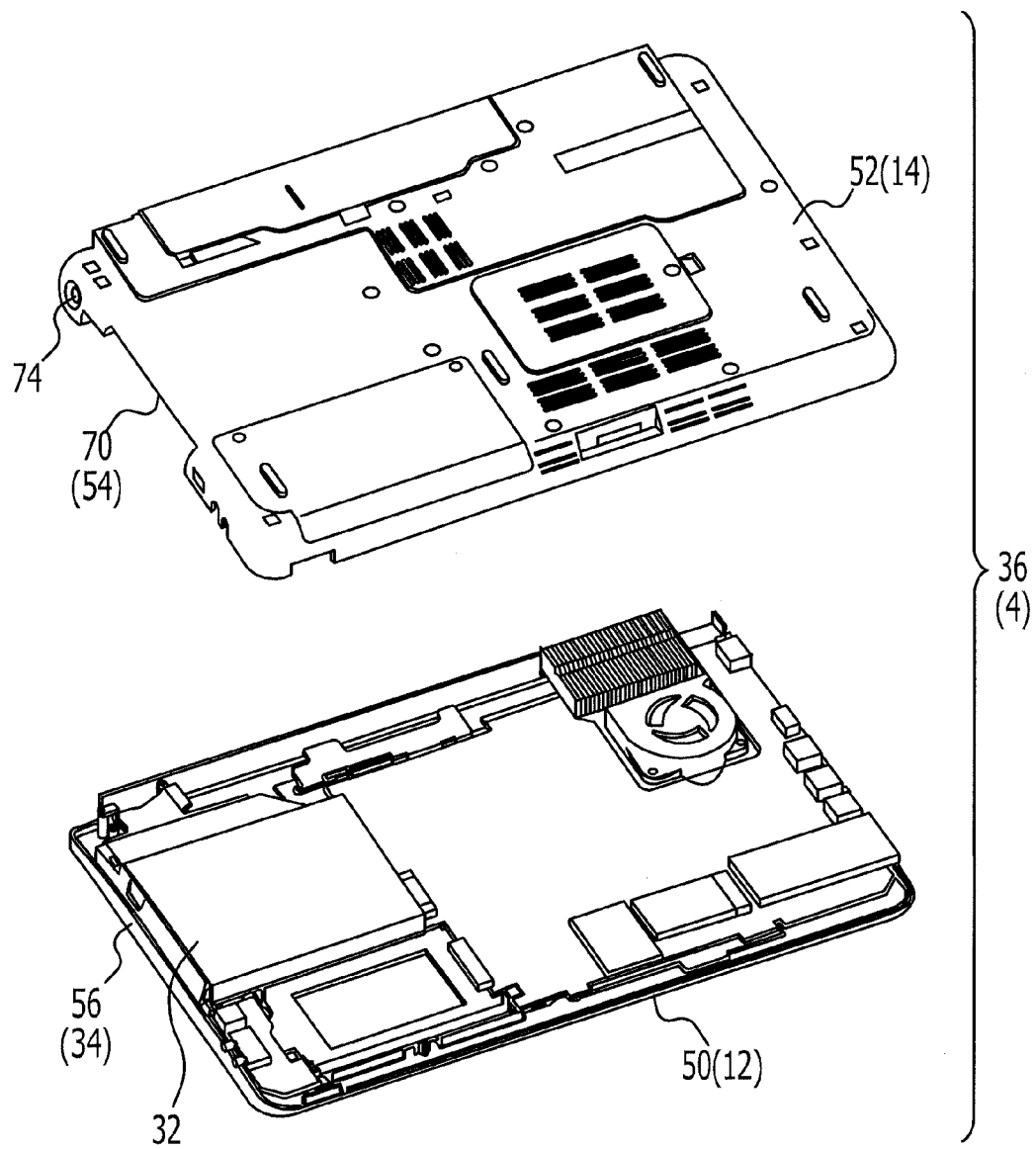
FIG. 9 illustrates an exemplary state of a main unit of a PC with a lower cover thereof removed.
Figure 10:
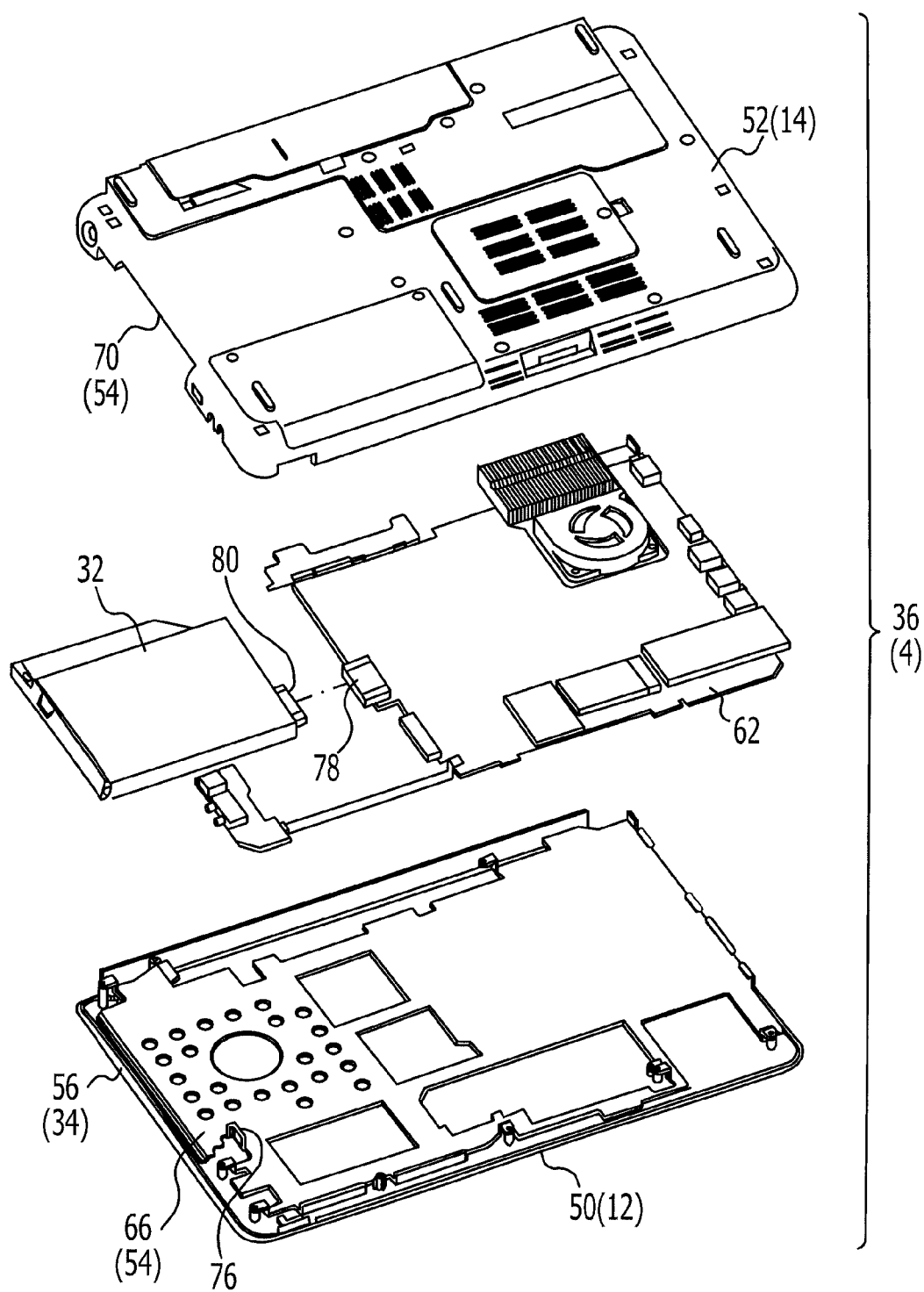
FIG. 10 is another exploded view illustrating an exemplary configuration of a main unit of a PC.
Figure 11:
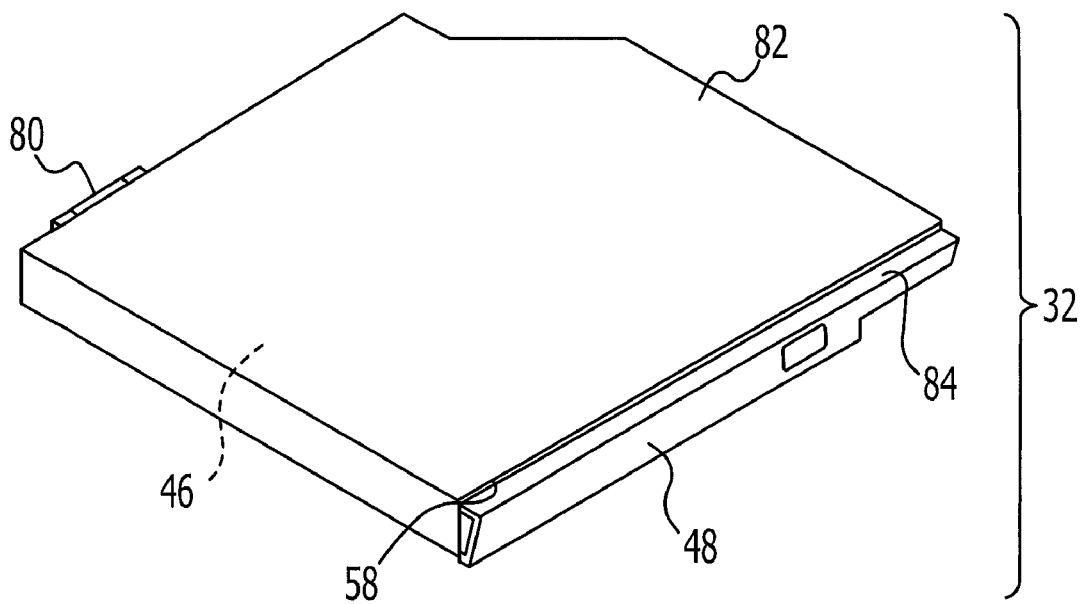
FIG. 11 illustrates an exemplary configuration of an ODD device.

The configuration of the main unit 36 of the PC 30 will now be described with reference to FIGS. 7, 8, 9, 10 and 11. FIG. 7 is an exploded view illustrating an exemplary configuration of the main unit 36 of the PC 30. FIG. 8 illustrates an exemplary bottom configuration of the main unit 36 of the PC 30. FIG. 9 illustrates an exemplary state of the main unit 36 of the PC 30 with the lower cover 52 thereof removed. FIG. 10 is another exploded view illustrating an exemplary configuration of the main unit 36 of the PC 30. FIG. 11 illustrates an exemplary configuration of the ODD device 32. The elements illustrated in FIGS. 7, 8, 9, 10 and 11 are only exemplary, and the present disclosure is not limited thereto.

The main unit 36 of the PC 30 includes layers of, for example, the operation portion 42, the upper cover 50, a control board 62, the ODD device 32, and the lower cover 52 in that order from the top.

The operation portion 42 has on the upper surface thereof resin keypads and the like, for example. A detection signal corresponding to an input operation realized by pressing any of the keypads is transmitted to the control board 62 through a connector cable 64. In accordance with the detection signal, the control board 62 controls operations including an operation of inputting a character and an operation of moving a cursor displayed on the display 44.

The upper cover 50 has on a side face thereof the rib 56 covering the upper portion of the ODD device 32 as described above, and also has a receiving portion 66 that receives the operation portion 42. A part of the back side of the receiving portion 66 resides above the ODD device 32 and defines the housing portion 54. The receiving portion 66 is made of, for example, a metal material and functions as a reinforcement that protects the ODD device 32, the control board 62, and other elements from the effects of the pressing of the operation portion 42 and so forth.

The control board 62 is a motherboard or the like. The control board 62 includes a connector with which the ODD device 32 is connected to the control board 62, a central processing unit (CPU) that controls the PC 30, a random access memory (RAM), and so forth.

The lower cover 52 has a plurality of retaining portions 68 that retain the control board 62 placed on the lower cover 52 at a specific position. The lower cover 52 also has on a side face thereof an opening 70 at a position corresponding to the position of the ODD device 32. Referring to FIGS. 8 and 9, when the lower cover 52 and the upper cover 50 are joined together, the opening 70 provides the housing portion 54 for the ODD device 32. The lower cover 52 is made of, for example, a resin material. During the insertion or removal of the ODD device 32 described separately below, the lower cover 52 allows a rotational movement of the ODD device 32 inside the housing portion 54.

In addition, hinge covers 72 and 74 that cover and retain the hinge portion 40, and other functional components may be provided on the upper cover 50 and the lower cover 52.

Referring to FIG. 10, the receiving portion 66 of the upper cover 50 may have, for example, an upright wall 76 that retains the ODD device 32. The upright wall 76 defines, for example, one side of the housing portion 54 and prevents the ODD device 32 from wobbling inside the main unit 36.

The control board 62 has a connector 78 that provides a connection to the ODD device 32 and through which data is transmitted to and from the ODD device 32. When the ODD device 32 is inserted into the housing portion 54 and a connector 80 provided at the rear of the ODD device 32 is connected to the connector 78, the ODD device 32 functions as means for recording and reading data in the PC 30.

Referring to FIG. 11, the ODD device 32 includes an ODD casing 82 that protects the tray 46 and the ODD medium placed therein. The ODD casing 82 is made of, for example, metal. The ODD cover 48 provided to the tray 46 resides at the front of the ODD device 32. The ODD cover 48 is positioned at, for example, a level lower than the upper casing edge 58 of the ODD casing 82. In the state where the ODD device 32 is in the main unit 36, the rib 56 projects to such a position as to cover the upper casing edge 58 of the ODD casing 82, with the tip of the rib 56 facing a top portion 84 of the ODD cover 48. Thus, the gap between the ODD device 32 and the upper edge of the housing portion 54 is covered, and the rib 56 forms the misinsertion-preventing structure 34.

Although the connector 80 illustrated in FIG. 11 is exposed to the outside of the ODD casing 82 of the ODD device 32, the present disclosure is not limited thereto. For example, the ODD casing 82 may have a cover that covers the connector 80, or a component to be coupled to the ODD casing 82 may be provided at the rear of the ODD device 32, whereby the connector 80 is connected to the connector 78 of the control board 62 inside the cover or the component.

According to the above configuration, the gap between the ODD device 32 and the casing of the PC 30 that houses the ODD device 32 is not exposed to the outside of the casing because of the structure included in the casing. Therefore, the misinsertion of an ODD medium is prevented, whereas the ease of assembly of the PC 30 is not reduced. Moreover, there is substantially no possibility that a gap is produced by deformation of the ODD device 32 or the PC 30. Therefore, the misinsertion of an ODD medium is prevented. Furthermore, the misinsertion-preventing structure 34 does not interfere with the ODD device 32. Therefore, the occurrences of abnormality of the ODD medium, noise, and the like are prevented.

Figure 12:
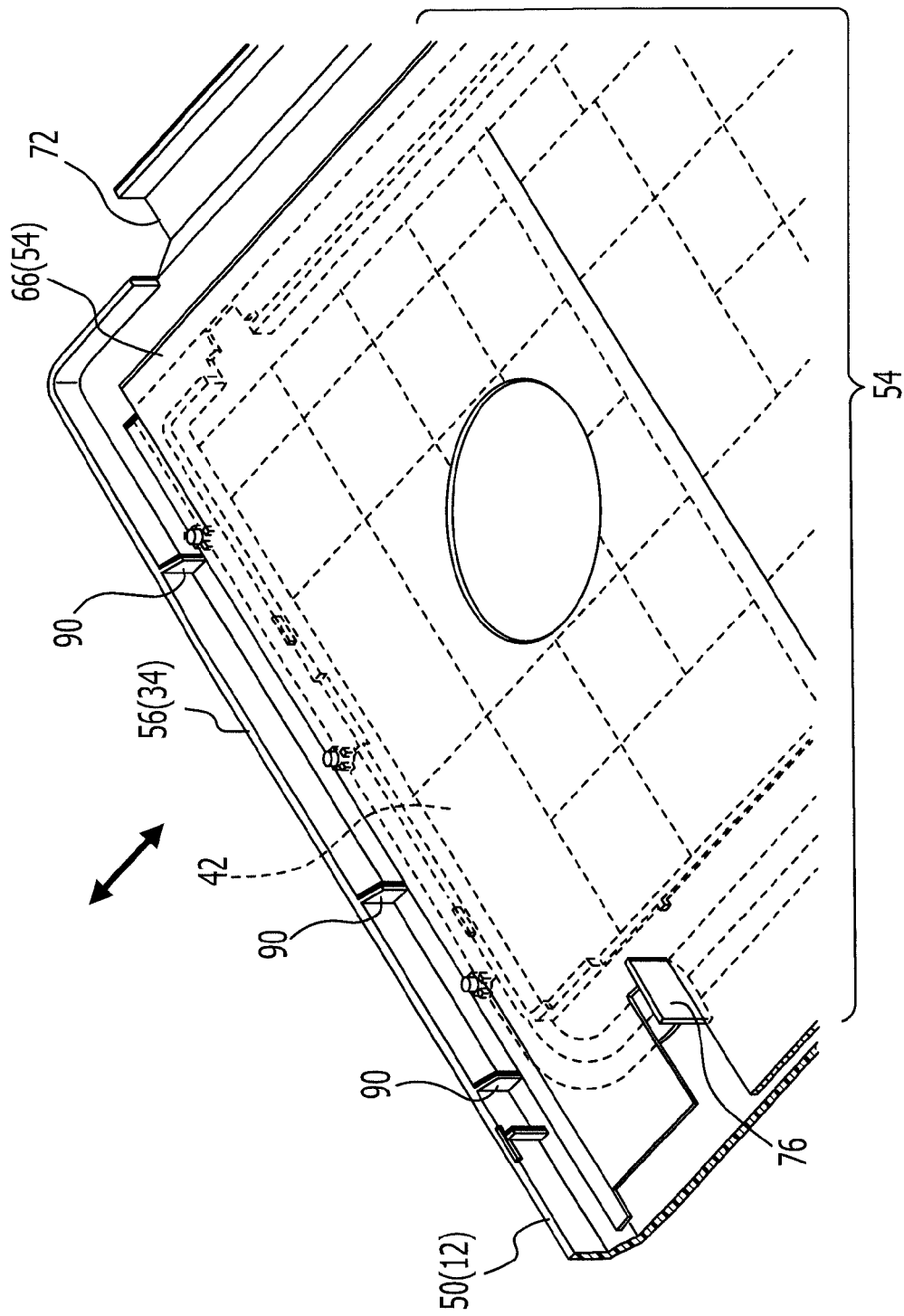
FIG. 12 illustrates an exemplary configuration of an upper cover according to an embodiment.

An embodiment will now be described with reference to FIGS. 12, 13A, 13B, 13C, 14A, 14B and 14C. FIG. 12 illustrates an exemplary configuration of the upper cover 50 according to an embodiment. FIGS. 13A, 13B and 13C illustrate different exemplary inserted and removed states of the ODD device 32. FIGS. 14A, 14B and 14C illustrate different exemplary inserted and removed states of the ODD device 32 with the lower cover 52 provided thereover. The elements illustrated in FIGS. 12, 13A, 13B, 13C, 14A, 14B and 14C are only exemplary, and the present disclosure is not limited thereto.

The upper cover 50 has the receiving portion 66 that receives the operation portion 42 and so forth. The back side of the receiving portion 66, i.e., the inner side of the main unit 36, forms the ceiling of the housing portion 54 that houses the ODD device 32. Furthermore, as described above, the upper cover 50 has on the side face thereof the rib 56 that prevents the misinsertion by covering a part of the upper portion of the ODD device 32 that is in the housed state.

The ODD device 32 is insertable into and removable from the housing portion 54 by being slid in directions of the double-headed arrow illustrated in FIG. 12. In the state where the upper cover 50 and the lower cover 52 are joined together, when, for example, the ODD device 32 is slid so as to be removed, the upper casing edge 58 of the ODD device 32 interferes with the rib 56 functioning as the misinsertion-preventing structure 34 described above, and the ODD device 32 cannot be removed from the housing portion 54.

Hence, the upper cover 50 has one or more insertion-removal ribs 90 on the inner side with respect to the rib 56. The insertion-removal ribs 90 form, for example, upright walls extending perpendicularly from the rib 56 toward the inside of the housing portion 54. The insertion-removal ribs 90 also slope downward from the rib 56 toward the inside of the housing portion 54. Therefore, the ODD device 32 moves in such a manner as to go over the insertion-removal ribs 90, and the direction of sliding thereof is thus changed, thereby becoming removable from the housing portion 54 without being blocked by the rib 56.

Referring to FIGS. 13, 13B and 13C, to remove the ODD device 32 that is in a state (illustrated in FIG. 13A) where the connector 78 and the connector 80 are connected to each other, the ODD device 32 is first moved toward the front by a distance $X_1$, for example, 5 mm. Accordingly, the upper casing edge 58 of the ODD device 32 comes into contact with the insertion-removal ribs 90 (see FIG. 13B). The arrangement of the housing portion 54, the insertion-removal ribs 90, and the connectors 78 and 80 is designed such that the connector 78 of the ODD device 32 and the connector 80 of the control board 62 are not completely disconnected from each other in the state illustrated in FIG. 13B. Such a configuration prevents the occurrence of a situation where, for example, the ODD device 32 becomes loose inside the housing portion 54 because the connector 78 and the connector 80 are completely disconnected from each other before the ODD device 32 becomes removable from the housing portion 54.

When the ODD device 32 is further moved toward the front by a distance $X_2$, for example, 2 mm, the ODD device 32 goes over the insertion-removal ribs 90, and the direction of the sliding movement thereof is changed in an obliquely downward direction (see FIG. 13C). When the ODD device 32 goes over the insertion-removal ribs 90, the connector 78 and the connector 80 are completely disconnected from each other. Thus, the ODD device 32 is removed from the housing portion 54.

FIGS. 14A, 14B and 14C illustrate the above removal operation with the lower cover 52 of the main unit 36 provided.

In the state where the connector 78 and the connector 80 are connected to each other, the ODD device 32 is housed at a predetermined position on the lower cover 52 (see FIG. 14A). As described above, when the ODD device 32 is slid toward the front, the upper casing edge 58 comes into contact with the insertion-removal ribs 90 (see FIG. 14B). When the ODD device 32 is further slid, the upper casing edge 58 goes over the insertion-removal ribs 90, and the direction of the sliding movement of the ODD device 32 is changed. The change in the direction of the sliding movement of the ODD device 32 bends and deforms the lower cover 52 in a direction of arrow A (see FIG. 14C). The lower cover 52 only needs to be made of an elastic material such as resin. Such a deformation of at least a part of the lower cover 52 allows the removal and insertion of the ODD device 32.

To insert the ODD device 32 into the housing portion 54, the removal operation described above is performed in the reverse order. That is, the ODD device 32 is slid along the insertion-removal ribs 90 into the housing portion 54, with the upper casing edge 58 being in contact with the insertion-removal ribs 90.

According to the above configuration, the misinsertion of an ODD medium is prevented by the rib 56. Moreover, since the ODD device 32 is slid along the sloping insertion-removal ribs 90, the insertion and removal of the ODD device 32 are performable without removing, for example, the lower cover 52.

Figure 15:
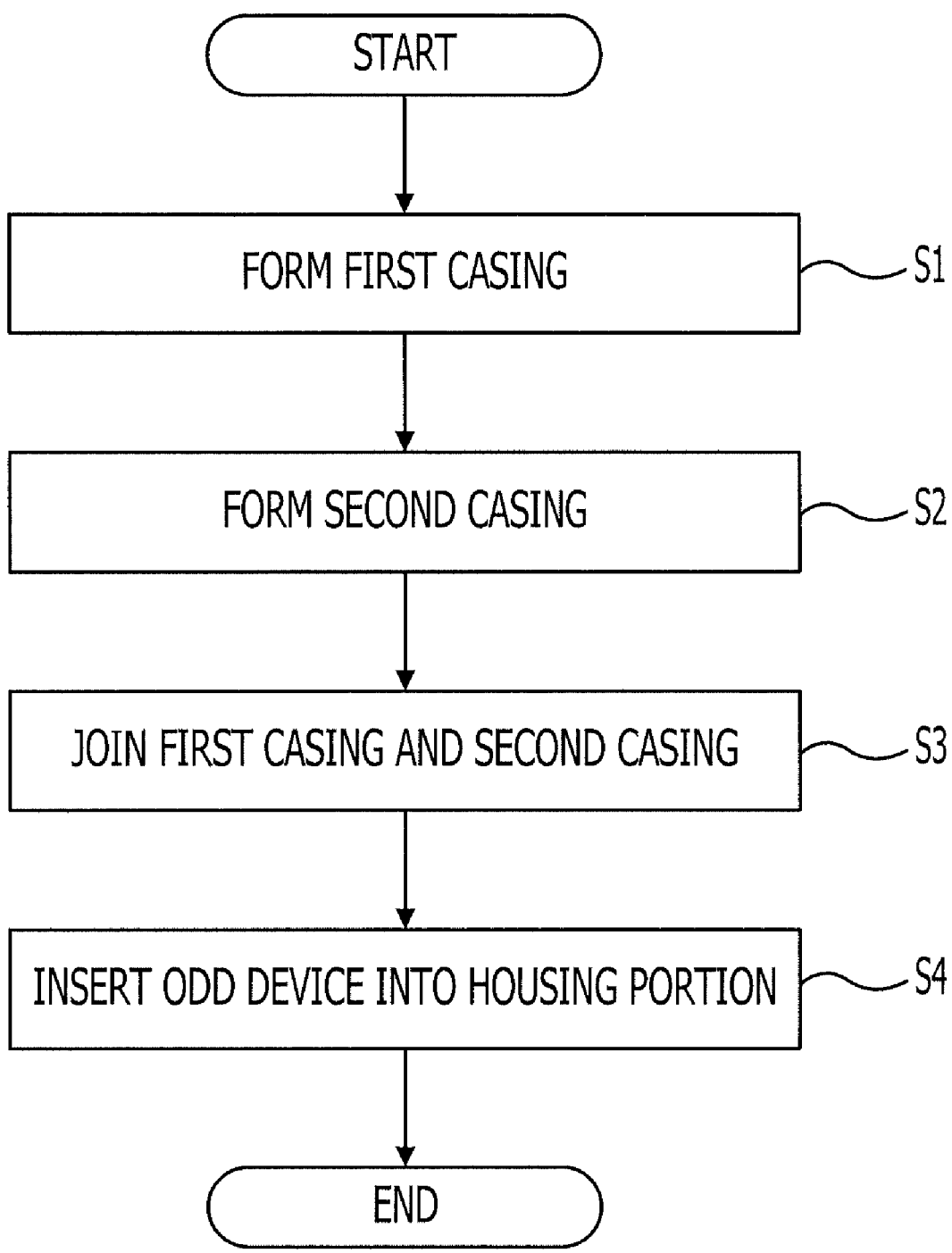
FIG. 15 is a flowchart illustrating an exemplary method of manufacturing an electronic apparatus according to an embodiment.

An embodiment will now be described with reference to FIG. 15. FIG. 15 is a flowchart illustrating an exemplary method of manufacturing an electronic apparatus according to an embodiment. The operations, procedure, and so forth illustrated in FIG. 15 are only exemplary, and the present disclosure is not limited thereto.

The method according to an embodiment is an exemplary method of manufacturing an electronic apparatus according to the present disclosure. The method according to an embodiment includes, for example, an operation of forming a first casing (Operation S1), an operation of forming a second casing (Operation S2), an operation of joining the first casing and the second casing (Operation S3), and an operation of inserting an ODD device into a housing portion (Operation S4).

In the operation of forming the first casing (Operation S1), the upper cover 50 of the main unit 36 of the electronic apparatus 2 is formed. For example, a resin material is molded into an integral housing that is to become the upper cover 50 having an opening that receives the operation portion 42 and also having the rib 56, the insertion-removal ribs 90, and so forth on the side face thereof. In this operation, the rib 56 is formed in such a manner as to cover the upper edge of the insertion slot 47 of the ODD device 32, and the receiving portion 66 and so forth are formed on the inner side of the upper cover 50.

In the operation of forming the second casing (Operation S2), the lower cover 52 is formed. For example, a resin material is molded into a housing that is to become the lower cover 52 having the retaining portions 68 that retain the control board 62 and also having on the side face thereof the opening 70 in which the ODD device 32 is to be positioned.

The upper cover 50 and the lower cover 52 are configured as described above.

In the joining operation (Operation S3), the first casing and the second casing molded as described above are joined together, thereby being assembled into the main unit 36. In this operation, the control board 62 and other elements are interposed at the respective positions between the upper cover 50 and the lower cover 52, as illustrated in FIG. 7. Thus, the housing portion 54 in which the ODD device 32 is to be housed is provided in the main unit 36.

Subsequently, the operation of inserting the ODD device 32 (Operation S4) is performed. In this operation, for example, the ODD device 32 is inserted into the housing portion 54 of the main unit 36 in such a manner as to be slid along the insertion-removal ribs 90 of the upper cover 50, as illustrated in FIGS. 14A, 14B and 14C. When, for example, the ODD cover 48 is pushed to a predetermined position, the rib 56 as the misinsertion-preventing structure 34 covers a part of the upper casing edge 58 of the ODD device 32. Furthermore, the connector 78 of the ODD device 32 and the connector 80 of the control board 62 are connected to each other.

The ODD device 32 may be connected to the connector 80 of the control board 62 in, for example, the operation of joining the first casing and the second casing (Operation S3). To disassemble the electronic apparatus 2, the operations described above are performed in the reverse order.

By providing the misinsertion-preventing structure 34 on the casing of the PC 30 that houses the ODD device 32 as described above, the number of components is prevented from increasing, and the ease of assembly of the PC 30 is not reduced. Moreover, the insertion and removal of the ODD device 32 are performable without disassembling the main unit 36.

According to the embodiments, some of the components forming the main unit 4 (or 36) of the electronic apparatus 2 (or PC 30) function as a misinsertion-preventing portion (the misinsertion-preventing structure 9 or 34) at the front of the insertion slot 24 (or 47) of the ODD unit 8 (or the ODD device 32).

According to the embodiments, the misinsertion-preventing portion is provided at such a position as not to interfere with the ODD unit 8 within a range in which the ODD unit 8 is maintained to be connected to the main unit 4 or at such a position as not to interfere with the ODD unit 8 by the rotational movement of the ODD unit 8 realized when connected to the main unit 4.

The misinsertion-preventing portion helps the rotational movement of the ODD unit 8 by raising the ODD unit 8 over the insertion-removal ribs 90 when the ODD unit 8 is inserted or removed.

Compared with typical misinsertion-preventing structures, the misinsertion-preventing structure according to an embodiment makes it difficult to insert an ODD medium into any gap other than the insertion slot 24, and prevents the misinsertion of the ODD medium that may be caused by the deformation of the ODD unit 8 or the electronic apparatus 2.

Even if any external pressure is applied to the electronic apparatus 2, the ODD unit 8 and the misinsertion-preventing portion do not interfere with each other. Therefore, there is substantially no possibility of noise generation and the occurrence of failure.

According to the embodiments, the misinsertion-preventing portion helps a rotational movement of the ODD unit 8 during an insertion or removal of the ODD unit 8. Therefore, the misinsertion-preventing portion can be provided in a smaller area.

Figure 16:
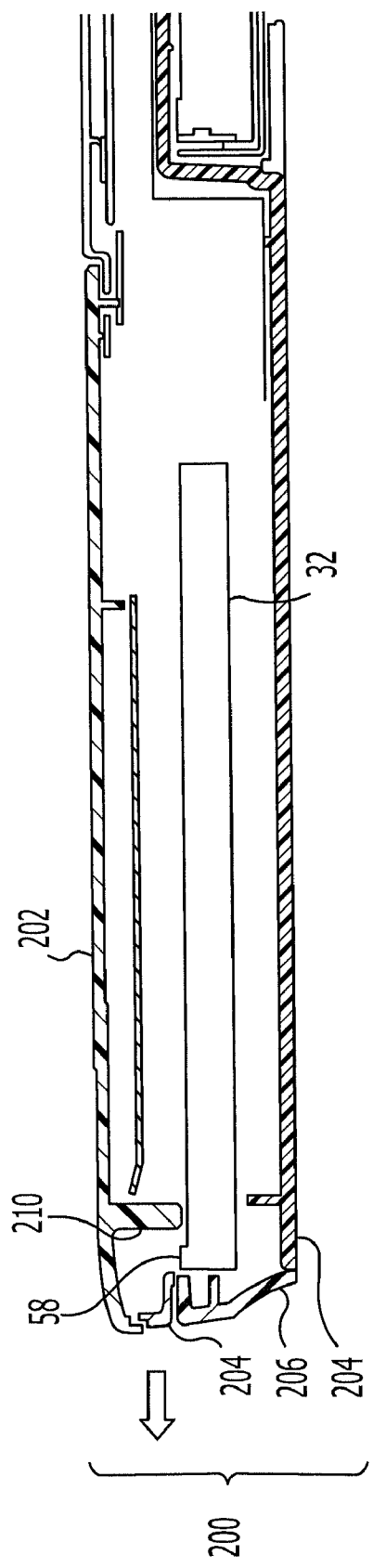
FIG. 16 illustrates a typical misinsertion-preventing structure.
Figure 17:
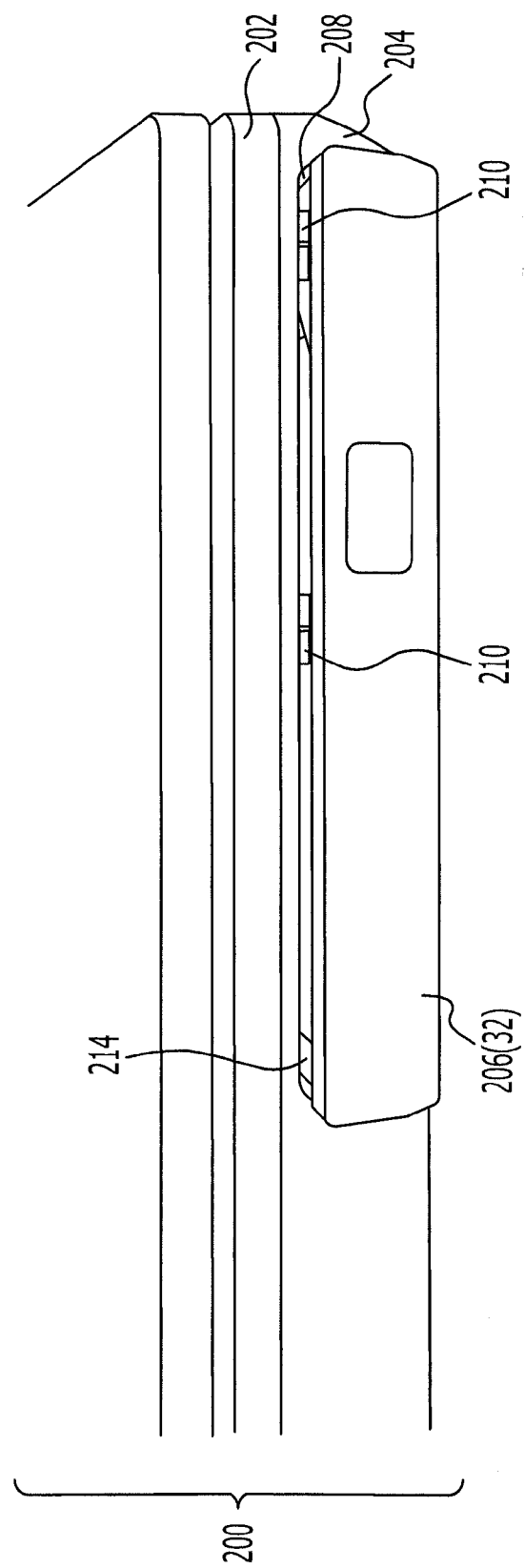
FIG. 17 illustrates an exemplary arrangement of components included in the typical misinsertion-preventing structure.
Figure 18:
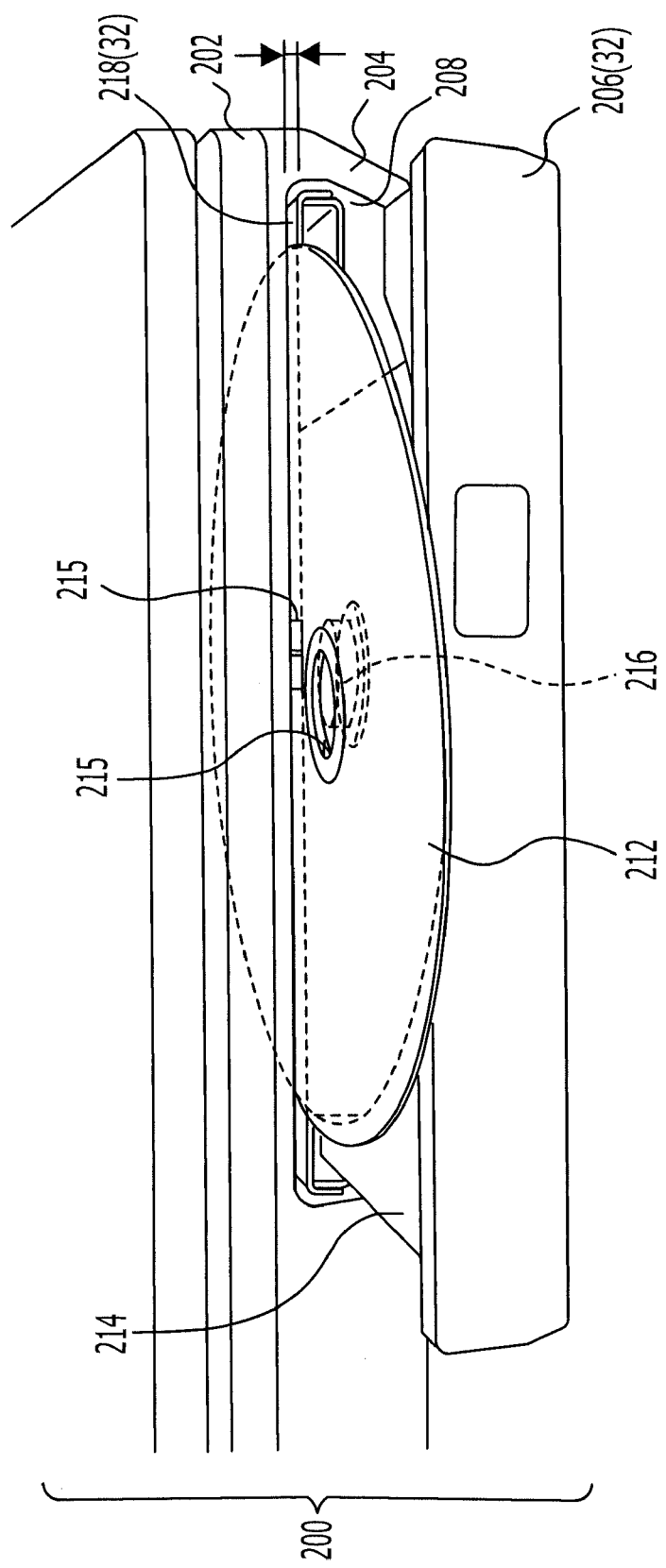
FIG. 18 illustrates an exemplary state of a misinserted ODD medium.

A comparative embodiment will now be described with reference to FIGS. 16, 17 and 18. FIG. 16 illustrates a typical misinsertion-preventing structure according to the comparative embodiment. FIG. 17 illustrates an exemplary arrangement of components included in the typical misinsertion-preventing structure. FIG. 18 illustrates an exemplary state of a misinserted ODD medium.

An electronic apparatus 200 according to the comparative embodiment is an information-processing apparatus having the ODD device 32 in a main unit thereof. The electronic apparatus 200 includes an upper cover 202 and a lower cover 204 that are joined together with the ODD device 32 and other control components interposed therebetween.

The ODD device 32 includes a conveying tray 214 (see FIG. 18) that conveys an ODD medium. The conveying tray 214 is slidable in a direction of the arrow illustrated in FIG. 16. The conveying tray 214 has an ODD cover 206. The ODD device 32 is housed in a housing opening 208 (see FIG. 18) defined by the lower cover 204. In a state where the conveying tray 214 is in the ODD device 32, the ODD cover 206 is positioned at the housing opening 208 and forms a part of the outer surface of the main unit of the electronic apparatus 200. The upper edge of the housing opening 208 is at such a level as to, for example, allow the passage of the upper casing edge 58 of the ODD device 32 for the insertion and removal of the ODD device 32.

The upper cover 202 has one or more ribs 210 functioning as components that prevent the misinsertion of an ODD medium into the ODD device 32 housed in the electronic apparatus 200. The ribs 210 are provided near the upper casing edge 58 of the ODD device 32 and is either in contact with or in proximity to the ODD device 32.

Referring to FIG. 17, when the conveying tray 214 of the ODD device 32 is slid and the ODD cover 206 moves away from the housing opening 208, the ribs 210 are exposed to the outside of the electronic apparatus 200.

FIG. 18 illustrates an exemplary state where an ODD medium 212 is inappropriately placed on the conveying tray 214, more specifically, a state where a receiving hole 215 provided in the ODD medium 212 does not fit onto a projection 216 provided on the conveying tray 214.

In such a state, when the conveying tray 214 is automatically or manually slid into the ODD device 32, the ODD medium 212 that is in an inappropriate position is stuck between a casing 218 of the ODD device 32 and the ribs 210. That is, if the conveying tray 214 is open, the casing 218 is exposed in the housing opening 208. There is, for example, a gap h between the upper edge of the housing opening 208 and the casing 218. Therefore, the ODD medium 212 may be misinserted into the gap h.

Hence, the ribs 210, functioning as the misinsertion-preventing components, are provided in the gap h. Nevertheless, if, for example, the ODD medium 212 is forcibly pushed into the gap h, the ODD device 32 or the electronic apparatus 200 may be deformed, and the ODD medium 212 may be misinserted.

Instead of the ribs 210, a sponge or the like may be provided as the misinsertion-preventing component in the gap between the ODD device 32 and the upper cover 202. However, providing the ribs 210 or the sponge in the gap prevents the ODD device 32 from sliding when the ODD device 32 is to be connected to the control board or the like. Therefore, the electronic apparatus 200 needs to be disassembled.

In contrast, in the PC 30, which is an exemplary electronic apparatus according to the present disclosure, the housing portion 54 is defined by the upper cover 50 and the lower cover 52 that are joined together, and the rib 56 provided on the upper cover 50 covers a part of the upper portion of the ODD device 32. Thus, the gap between the ODD device 32 and the upper edge of the housing portion 54 is not exposed to the outside of the PC 30 even in the state where the tray 46 of the ODD device 32 is open. Therefore, the misinsertion of an ODD medium is prevented. Moreover, since the rib 56 functioning as the misinsertion-preventing structure 34 does not interfere with the ODD device 32, the ODD device 32 is not subjected to external pressure, and the occurrences of noise and abnormalities are prevented.

According to an embodiment, the electronic apparatus enables accurate insertion of a disk medium by guiding the disk medium towards the insertion slot that remains within the electronic apparatus. As such, according to an embodiment since the insertion slot is not extended outside the electronic apparatus and remains defined by the same area whether the conveying tray is extended or not, incorrect placement of the disk medium is reduced.

According to an embodiment a method of manufacturing an electronic apparatus is provided. The method includes forming an upper casing of a disk drive unit having an insertion slot positioned within an inside portion of the electronic apparatus, and forming a lower casing parallel to the upper casing, where a conveying tray extends out from the electronic apparatus while the insertion slot remains within the electronic apparatus and receives a recording medium.

Figure 19:
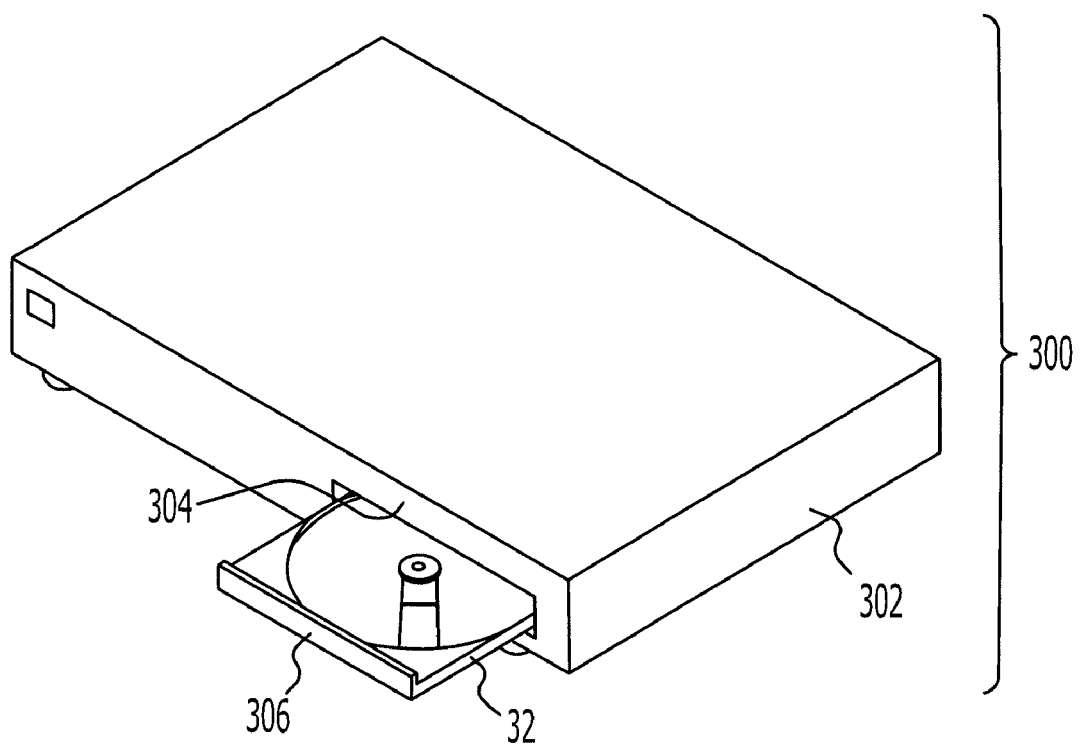
FIG. 19 illustrates an exemplary configuration of an apparatus according to another embodiment.

While the above embodiments concern the electronic apparatus 2 and the PC 30 as an exemplary electronic apparatus according to the present disclosure, the present disclosure is not limited thereto. The electronic apparatus including the ODD device 32 housed in the housing thereof may be, for example, an apparatus 300 that reads and writes data from and onto an ODD medium such as a CD or a DVD. Referring to FIG. 19, the apparatus 300 includes, for example, a housing 302 having a housing portion that houses the ODD device 32. The housing 302 has a rib 304 covering a part of the upper portion of the ODD device 32 housed therein, as in the above embodiments. Thus, the gap between the ODD device 32 and the upper edge of the housing portion is not exposed even in a state where a tray 306 of the ODD device 32 is open. Such a configuration also prevents the misinsertion of an ODD medium.

Alternatively, the electronic apparatus 2 including the ODD device 32 may be, for example, a game machine, a personal digital assistant (PDA), an externally connected recording apparatus, or the like.

While exemplary embodiments of the electronic apparatus and the method of manufacturing the same according to the present disclosure have been described above, the present invention is not limited thereto, and various modifications and changes can be made thereto by those skilled in the art on the basis of the spirit of the present invention disclosed in the appended claims and in the embodiments. Needless to say, such modifications and changes are within the scope of the present invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. An electronic apparatus, comprising:
    a disk drive unit provided inside the electronic apparatus and having an insertion slot into which a disk medium is to be slid;
    a first casing covering an upper side of the disk drive unit and including a cover portion covering an upper edge of the insertion slot; and
    a second casing joined to the first casing and providing a housing portion housing the disk drive unit, and
    wherein the cover portion includes an insertion-removal rib configured to come into contact with the disk drive unit when the disk drive unit is moved in a direction of sliding of the disk medium and to change a direction of movement of the disk drive unit.

2. The electronic apparatus according to claim 1, wherein the cover portion covers a part or an entirety of the upper edge of the insertion slot of the disk drive unit in a housed state.

3. The electronic apparatus according to claim 1, wherein the disk drive unit has a first connector, wherein the housing portion is provided, at a position to which the disk drive unit is inserted, with a second connector to be connected with the first connector of the disk drive unit, and wherein the first connector and the second connector are disconnected when the direction of movement of the disk drive unit is changed upon contact of the disk drive unit, moving in the direction of sliding of the disk medium, with the insertion-removal rib.

4. The electronic apparatus according to claim 1, wherein, when the second casing comes into contact with the disk drive unit whose direction of movement has been changed, a part of the second casing deforms to allow insertion and removal of the disk drive unit.

5. The electronic apparatus according to claim 1, wherein a gap between the disk drive unit and an upper edge of the housing portion is not exposed to an outside of the electronic apparatus to receive the disk medium.

6. A method of manufacturing an electronic apparatus, the method comprising:

forming a cover portion on a first casing to cover an upper side of a disk drive unit having an insertion slot into which a disk medium is to be slid and to cover an upper edge of the insertion slot;

forming a second casing to be joined to the first casing and to provide a housing portion housing the disk drive unit; and forming, on the cover portion, an insertion-removal rib configured to come into contact with the disk drive unit when the disk drive unit is moved in a direction of sliding of the disk medium and to change a direction of movement of the disk drive unit.

7. The method according to claim 6, wherein the cover portion is formed to cover a part or an entirety of an upper edge of the insertion slot of the disk drive unit in a housed state.

8. A method of manufacturing an electronic apparatus, comprising:

forming an upper casing of a disk drive unit having an insertion slot positioned within an inside portion of the electronic apparatus;

forming a lower casing parallel to the upper casing, where a conveying tray extends out from the electronic apparatus while the insertion slot remains within the electronic apparatus and receives a recording medium; and forming, on the upper casing, an insertion-removal rib configured to come into contact with the disk drive unit when the disk drive unit is moved in a direction of sliding of a disk medium and to change a direction of movement of the disk drive unit.

* * * * *